US012042686B2

(12) United States Patent
Sergakis et al.

(10) Patent No.: US 12,042,686 B2
(45) Date of Patent: Jul. 23, 2024

(54) ASSEMBLY FOR WEIGHTLIFTING RACKS

(71) Applicant: Coulter Ventures, LLC., Columbus, OH (US)

(72) Inventors: Emmanuel Sergakis, Plain City, OH (US); Nash Dunahay, Blacklick, OH (US); Bill Henniger, Columbus, OH (US)

(73) Assignee: Coulter Ventures, LLC., Columbus, OH (US)

(*) Notice: Subject to any disclaimer, the term of this patent is extended or adjusted under 35 U.S.C. 154(b) by 0 days.

(21) Appl. No.: 18/230,984

(22) Filed: Aug. 7, 2023

(65) Prior Publication Data

US 2023/0381572 A1    Nov. 30, 2023

Related U.S. Application Data

(63) Continuation of application No. 17/466,267, filed on Sep. 3, 2021, now Pat. No. 11,717,715, which is a continuation of application No. 16/275,027, filed on Feb. 13, 2019, now Pat. No. 11,110,316, which is a continuation-in-part of application No. 29/656,317, filed on Jul. 11, 2018, now Pat. No. Des. 890,273.

(60) Provisional application No. 62/629,898, filed on Feb. 13, 2018.

(51) Int. Cl.
| A63B 21/078 | (2006.01) |
| A63B 71/00 | (2006.01) |
| F16M 13/02 | (2006.01) |

(52) U.S. Cl.
CPC ........ *A63B 21/078* (2013.01); *A63B 21/0783* (2015.10); *A63B 71/0054* (2013.01); *A63B 2209/00* (2013.01); *F16M 13/022* (2013.01)

(58) Field of Classification Search
None
See application file for complete search history.

(56) References Cited

U.S. PATENT DOCUMENTS

| 8,337,370 | B2* | 12/2012 | Rogers | A63B 71/0036 |
| | | | | 482/94 |
| 10,086,226 | B2* | 10/2018 | Nelson | A63B 21/4035 |
| 2006/0035765 | A1* | 2/2006 | Smith | A63B 21/078 |
| | | | | 482/97 |
| 2015/0083681 | A1* | 3/2015 | Childs | A47F 7/00 |
| | | | | 211/85.7 |
| 2015/0290488 | A1* | 10/2015 | Hopperstad | A63B 17/04 |
| | | | | 482/38 |

(Continued)

*Primary Examiner* — Joshua Lee
(74) *Attorney, Agent, or Firm* — Banner & Witcoff, Ltd.

(57) ABSTRACT

A bracket assembly includes a back plate with outer and inner sides and a pin opening extending therethrough. A clasp member has an extending portion and an encasing portion extending from the extending portion. The extending and encasing portions and the inner side of the back plate define a channel configured to receive a rack beam. A pin seated in the pin opening has a shank and an enlarged head positioned at the outer side of the back plate. The shank extends through the opening into the channel and is configured to engage the rack beam within the channel. The head may be welded to the outer side of the back plate. A functional member for use in a weightlifting exercise is connected to the back plate and extends away from the back plate. The functional member may be extension member defining a support surface.

22 Claims, 12 Drawing Sheets

(56) References Cited

U.S. PATENT DOCUMENTS

2017/0007877 A1\* 1/2017 Leipheimer ........ A63B 21/4029

\* cited by examiner

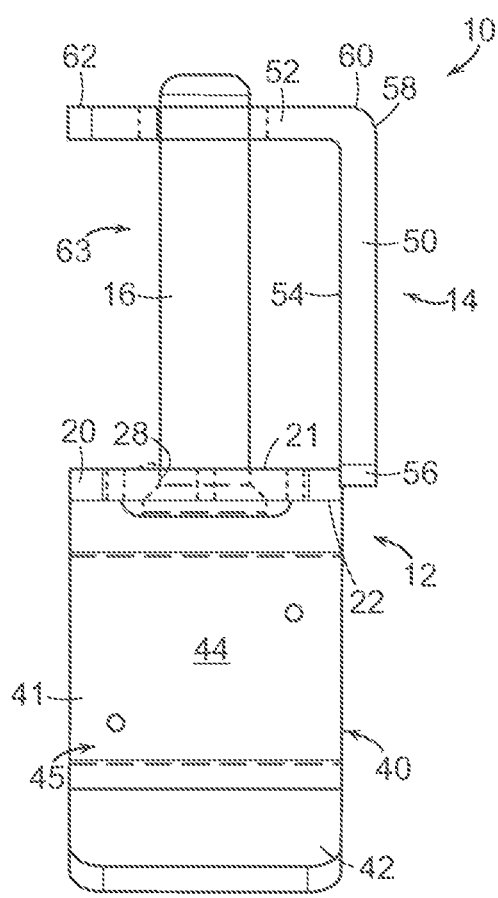
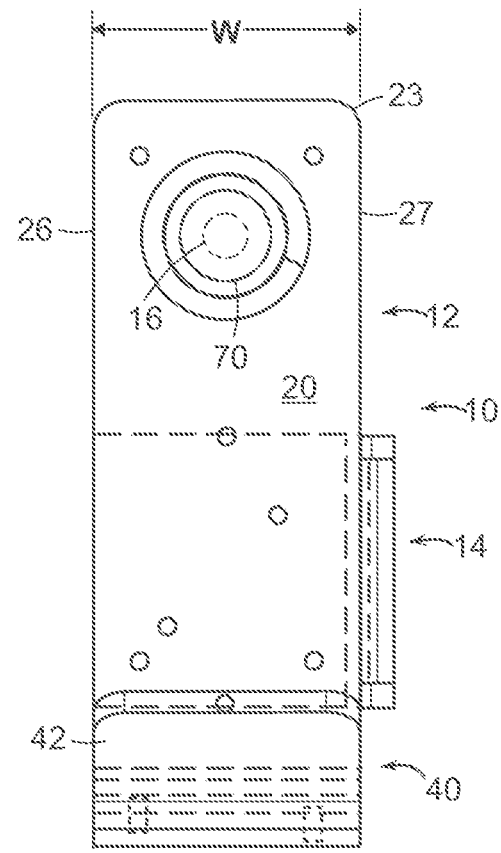
FIG. 3
FIG. 4

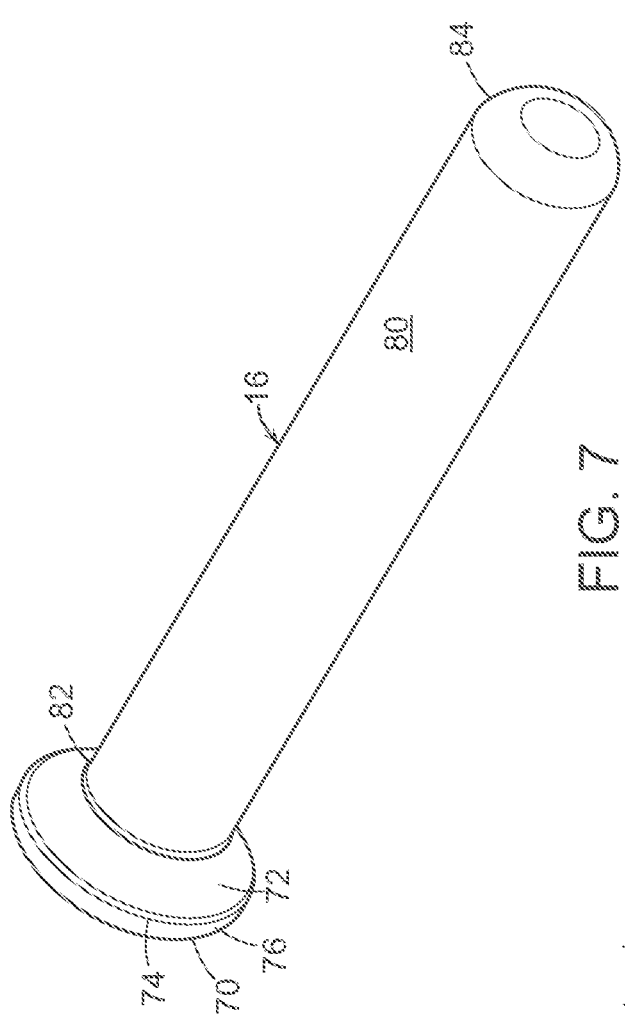
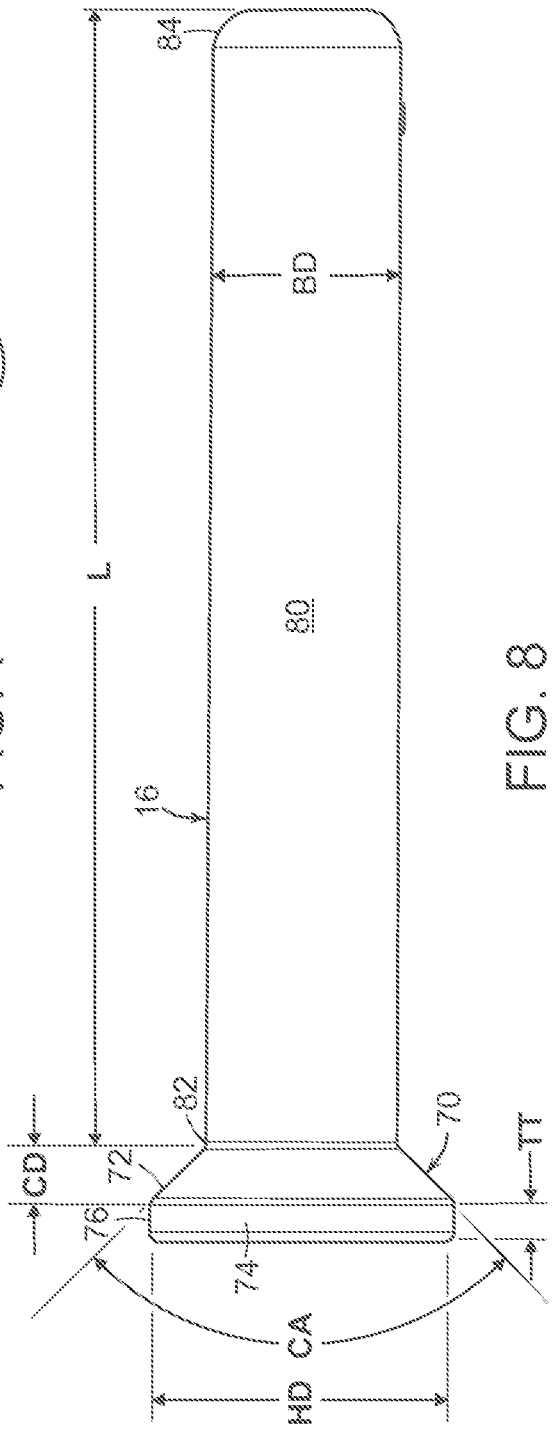
FIG. 7
FIG. 8

ASSEMBLY FOR WEIGHTLIFTING RACKS

CROSS-REFERENCE TO RELATED APPLICATIONS

This application is a continuation of, and claims priority to U.S. patent application Ser. No. 17/466,267, filed Sep. 3, 2021, and issued as U.S. Pat. No. 11,717,715 on Aug. 8, 2023, which is a continuation of U.S. patent application Ser. No. 16/275,027, filed Feb. 13, 2019, and issued as U.S. Pat. No. 11,110,316 on Sep. 7, 2021, which is a non-provisional of, and claims priority to, U.S. Provisional Application No. 62/629,898, filed Feb. 13, 2018, and which is also a continuation-in-part of U.S. Design Application No. 29/656,317, filed on Jul. 11, 2018, and issued as U.S. Design Pat. No. D890,273 on Jul. 14, 2020, each of which is incorporated by reference herein in its entirety and made part hereof.

FIELD

Aspects of this disclosure relate relates in general to weightlifting equipment, and more particularly, to weightlifting equipment that can be utilized with racks and rigs in the form of a bracket assembly configured to be coupled to a rack or rig.

BACKGROUND

The use of weightlifting racks and rigs is ever increasing. With the recent surge of popularity in "lifting heavy things" and the traditional weightlifting exercises, many more people are utilizing racks and rigs. In fact, there are many home gyms that are now centered around a rack or rig.

To support the weight of a barbell or the like, brackets or the like can be coupled to the beams of a rack or rig to support the weight. In certain embodiments, the brackets may be grasping hooks. These brackets, hooks or the like can be positioned at a number of different locations on the beams so as to adjust to different size individuals as well as to different lifting exercises. One such hook is known as a J-cup. Such a hook includes a pin and a channel for the beam. The hook may have an extended part, in many instances, that extends just above the channel. To assemble such a hook with the rack or rig, the hook is rotated so that the channel is out of the way of the beam. At such time, the pin is extended through a corresponding opening or aperture in the beam. Once the pin is inserted, the hook is rotated so as to direct the channel over the beam.

It will be understood that safety and strength of these brackets is paramount. In some instances, the lifter may be in a very vulnerable position and potentially exposed to extreme bodily injury if a bracket fails. In other instances, where a bracket does not fail, the increased repetition rate or usage of weights on the bracket may deform the bracket such that premature replacement is necessitated.

It would be advantageous to improve the strength and capabilities of such bracket. It would be desirable to provide a bracket that reduces or overcomes some or all of the difficulties inherent in prior known devices. Particular objects and advantages will be apparent to those skilled in the art, that is, those who are knowledgeable or experienced in this field of technology, in view of the following disclosure and detailed description of certain embodiments.

BRIEF SUMMARY

In accordance with a first aspect, a bracket assembly for use in association with a rack includes a back plate with an outer side and an inner side opposite the outer side. The back plate includes a pin opening extending through the back plate from the outer side to the inner side. A clasp member extends from the back plate and has an extending portion extending rearwardly from the back plate and an encasing portion extending laterally from the extending portion. The extending portion and the encasing portion of the clasp member and the inner side of the body define a channel configured to receive a beam of the rack. A pin is seated in the pin opening, with the pin having a shank and a head that is enlarged with respect to the shank. The head of the pin is positioned at the outer side of the back plate and the shank extends from the head through the pin opening and into the channel. The shank of the pin is configured to engage the beam of the rack within the channel, and the head is welded to the outer side of the back plate. An extension member defines a support surface configured to support an object, the extension member includes a pair of substantially J-shaped plates extending outwardly away from an outer side of the back plate and a cover nested with the substantially J-shaped plates such that the cover forms the entire support surface and is substantially flush with side surfaces of the substantially J-shaped plates.

In accordance with another aspect, a bracket assembly for use in association with a rack, the bracket assembly includes a body having a back plate with an outer side and an inner side opposite the outer side. The back plate includes a pin opening, with the pin opening including a cylindrical wall and a countersink. A clasp member extends from the back plate, wherein the clasp member and the inner side of the body define a channel configured to receive a beam of the rack. A pin is seated in the pin opening, and the pin has a head and a shank. The head is enlarged with respect to the shank, and the shank extends through the pin opening. The head is welded to the outer side of the back plate. An extension member includes a pair of substantially J-shaped plates extending outwardly away from the outer side of the back plate and a cover nested with the substantially J-shaped plates. The cover includes a first portion having a first lip extending outwardly from a first side of the first portion, a second lip extending outwardly from a second side of the first portion, a second portion having a first lip extending outwardly from a first side of the second portion, and a second lip extending outwardly from a second side of the second portion. The first and second lip of the first portion extend along and cover top and front surfaces of the substantially J-shaped plates. The first and second lips of the second portion extend along and cover bottom surfaces of the substantially J-shaped plates such that the cover is substantially flush with side surfaces of the substantially J-shaped plates.

In accordance with a further aspect, a bracket assembly for use in association with a rack, the bracket assembly includes a body having a back plate with an outer side and an inner side opposite the outer side. A clasp member extends from the back plate and has an extending portion extending rearwardly from the back plate and an encasing portion extending laterally from the extending portion. The extending portion and the encasing portion of the clasp member and the inner side of the back plate define a channel configured to receive a beam of the rack. A pin has a shank extending from the back plate and into the channel such that the shank of the pin is configured to engage the beam of the rack within the channel. An extension member defines a support surface configured to support an object. The extension member includes a pair of plates, with each plate having a leg extending outwardly away from an outer side of the back plate, and a cover nested with the plates. The cover is positioned between the plates and has a top portion covering a top side of the leg of each of the plates such that the top portion of the cover defines the entire support surface. The cover has first and second lips, with each of the first and second lips extending outwardly to one side of the plates.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which:

FIG. 3 is a top plan view of the J-cup assembly of FIG. 1.

FIG. 4 is a front elevation view of the J-cup assembly of FIG. 1.

FIG. 7 is a perspective view of the pin of FIG. 1.

FIG. 8 is a side elevation view of the pin of FIG. 1.

Figure 1:
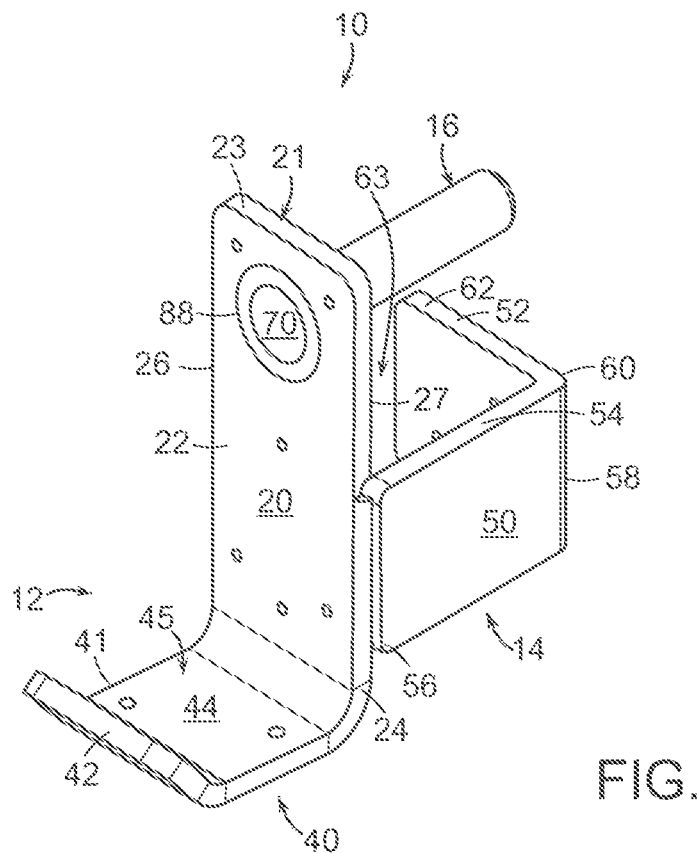
FIG. 1 is a perspective view of one embodiment of a bracket assembly in the form of a J-cup according to aspects of the disclosure.

The figures referred to above are not drawn necessarily to scale, should be understood to provide a representation of particular embodiments, and are merely conceptual in nature and illustrative of the principles involved. Some features of the bracket assemblies depicted in the drawings have been enlarged or distorted relative to others to facilitate explanation and understanding. The same reference numbers are used in the drawings for similar or identical components and features shown in various alternative embodiments. Bracket assemblies as disclosed herein would have configurations and components determined, in part, by the intended application and environment in which they are used.

DETAILED DESCRIPTION OF EMBODIMENTS

In the following description of various example structures in accordance with the disclosure, reference is made to the accompanying drawings, which form a part hereof, and in which are shown by way of illustration of various structures in accordance with the disclosure. Additionally, it is to be understood that other specific arrangements of parts and structures may be utilized, and structural and functional modifications may be made without departing from the scope of the present disclosure. Also, while spatial terms such as "top", "bottom", rear, front, vertical, and the like may be used in this specification to describe various example features and elements of the disclosure, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated Referring now to the drawings and in particular to FIGS. 1-4, a bracket assembly is shown generally at 10. In the illustrated embodiment, bracket assembly 10 is in the form of a J cup attachment. It is to be appreciated that bracket assembly 10 need not necessarily take the form of a J-cup, and other suitable bracket types will become readily apparent to those skilled in the art, given the benefit of this disclosure.

A bracket assembly such bracket assembly 10 may be configured for attachment to a weightlifting rack or rig, as seen and described in greater detail below, and may be configured to support a piece of equipment in a desired orientation on the rack or rig. For example, the piece of equipment may comprise a weightlifting barbell or the like. Bracket assembly 10, as will be explained below, can be releasably coupled to the rack or rig in a number of different orientations. And, in one configuration, a pair of J-cup assemblies 10 can be utilized to support a barbell at, for example, a desired height, such as, a height suitable for executing squatting, pressing, or pulling exercises. There is no particular limitation for the use of the J-cup assembly with any particular type of rack or rig, or for any particular type of exercise.

Bracket assembly 10 may include a body 12, a clasp member 14 extending outwardly from body 12, and a pin 16 extending outwardly from body 12. Body 12, in the embodiment illustrated in FIG. 1, includes a back plate 20 and an extension member 40. In the illustrated embodiment, extension member 40 is integrally formed with back plate 20. As used herein, the term "integrally formed" is intended to mean that extension member 40 and back plate are formed as a unitary, monolithic element of one-piece construction, and not separate elements formed and subsequently secured or attached to one another. In other embodiments, back plate 20 may be a separate element distinct from extension member 40, and extension member 40 itself may be formed from a plurality of different components, and may be attached to back plate 20 through any number of different means and structures, such as welding, adhesion, interference, fasteners, or combinations of these.

Figure 5:
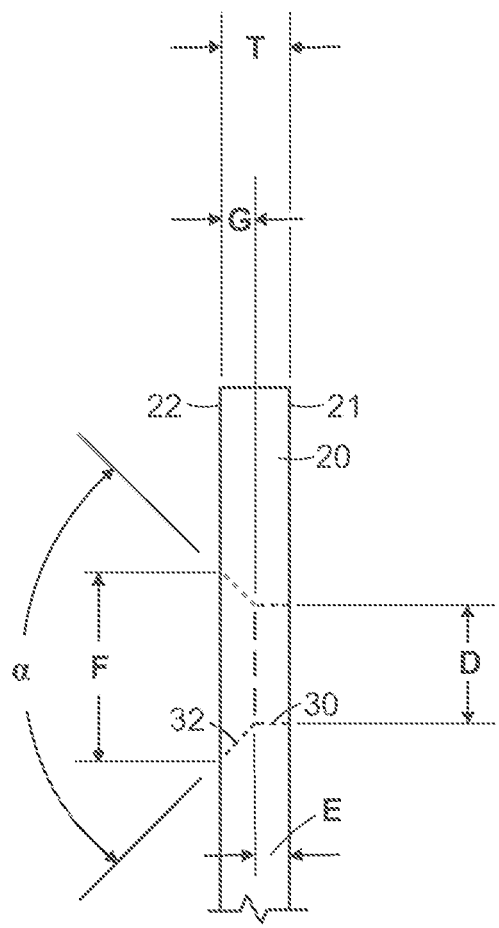
FIG. 5 is a partial cross-sectional view of the back plate of FIG. 1, showing, in particular, the pin opening thereof.

Back plate 20 may include an outer side 22, an inner side 21, an upper end 23, a lower end 24, a first side edge 26, an opposed second side edge 27, and a pin aperture or opening 28 extending through back plate 20. Back plate 20 may be a generally elongated rectangular member having a substantially flat outer side 22 that can abut a generally flat beam of a rack or rig. In the configuration shown, outer side 22 may comprise a plane that is substantially parallel to inner side 21, defining a thickness T, as seen in FIG. 5. In the configuration shown, thickness T is approximately 0.375", which is not to be deemed limiting, but exemplary.

The term "approximately" as used herein is meant to mean close to, or about a particular value, within the constraints of sensible commercial engineering objectives, costs, manufacturing tolerances, and capabilities in the field of weightlifting equipment manufacturing and use. Similarly, the term "substantially" as used herein is meant to mean mostly, or almost the same as, within the constraints of sensible commercial engineering objectives, costs, manufacturing tolerances, and capabilities in the field of weightlifting equipment manufacturing and use.

First side edge 26 and second side edge 27 define a width W of back plate 20 as seen in FIG. 4. Generally, first side edge 26 and second side edge 27 are substantially parallel to each other, and width W may correspond to a width of the beam to which Bracket assembly 10 is attached. It to be appreciated that back plate 20 may have a width W that is wider or narrower than that of the beam to which Bracket assembly 10 is attached.

Pin opening 28 may be an aperture that extends completely through back plate 20 from inner side 21 to outer side 22. Pin opening 28 is shown in greater detail in FIG. 5 including a cylindrical wall 30 and a countersink 32. Cylindrical wall 30 may have a diameter D and a depth E. In certain embodiments, diameter D may be approximately 0.625" and depth E may be approximately 0.192". It is to be appreciated that diameter D and depth E may have other values, and these are merely exemplary.

Countersink 32 may have a chamfer angle α, an outer diameter F, and a depth G. In certain embodiments, chamfer angle α may be between approximately 60° and 120°, or approximately 90° in other embodiments. In certain embodiments, outer diameter F may be between approximately 0.75" and 1.5", or approximately 1.010" in other embodiments. In certain embodiments, depth G may be between approximately 0.125" and 0.25", or approximately 0.188" in other embodiments. It is to be appreciated that chamfer angle α, outer diameter F, and depth G may have other values, and these are merely exemplary.

Figure 2:
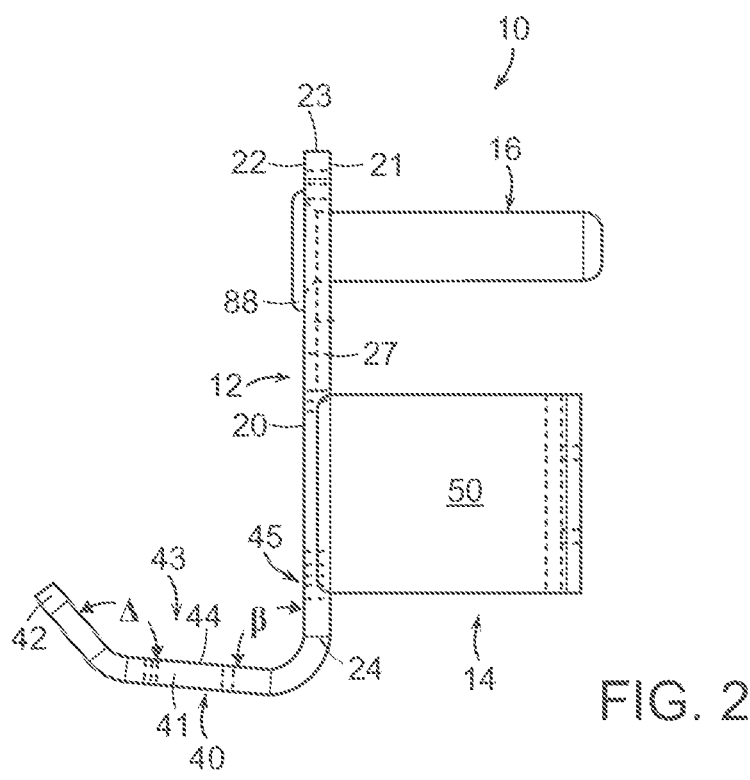
FIG. 2 is a side elevation view of the J-cup assembly of FIG. 1.

As seen in FIGS. 1 and 2, extension member 40 may extend away from lower edge 24 of back plate 20, and may include an outward leg 41 and an outer lip 42. Outward leg 41 may include an upper surface 44, and extends outwardly away from back plate 20, defining an oblique acute angle β therebetween. In certain embodiments, angle β may be between approximately 80° and 100°, more specifically between approximately 82° and 90°, or approximately 85°. Outer lip 42 may extend upwardly from a distal end of outward leg 41, defining an obtuse angle Δ therebetween. In certain embodiments, angle Δ may be between approximately 125° and 145°, more specifically between approximately 130° and 140°, or approximately 135°.

Back plate 20, outward leg 41, and outer lip 42 collectively define a channel 43, which can serve as a barbell channel, for example. It will be understood that channel 43 can be used to hold, hang and/or retain other structures, that is, structures other than a barbell, and while it may be referred to as a barbell channel, it is not limited to any particular use. The extension member 40 generally defines a support surface 45 configured to engage and support an object such as a barbell, and the support surface 45 at least partially defines the channel 43.

As seen most clearly in FIGS. 1 and 3, clasp member 14 may include an extending leg 50, an encasing leg 52, and an interior surface 54. Extending leg 50 may include a proximal end 56, which may extend from second side edge 27 of back plate 20, and a distal end 58. Encasing leg 52 may include a proximal end 60 and a distal end 62. Proximal end 60 may extend from distal end 58 of extending leg 50. Cooperatively, extending leg 50 and encasing leg 52 define interior surface 54 of clasp member 14. Interior surface 54 together with inner side 21 of back plate 20 cooperate to define a channel 63, which is sized to receive a beam 64 of a rack or rig, as seen in FIG. 6.

In the illustrated embodiment, encasing leg 52 is substantially perpendicular to extending leg 50, and encasing leg 52 is substantially parallel with inner side 21 of back plate Clasp member 14 may be coupled or secured to back plate 20 by welding proximal end 56 of extending leg 52 to second side edge 27 of back plate 20. In other configurations, the two structures may be integrally formed from a monolithic piece of sheet metal and deformed into the desired shape through a stamping process, for example.

Figure 6:
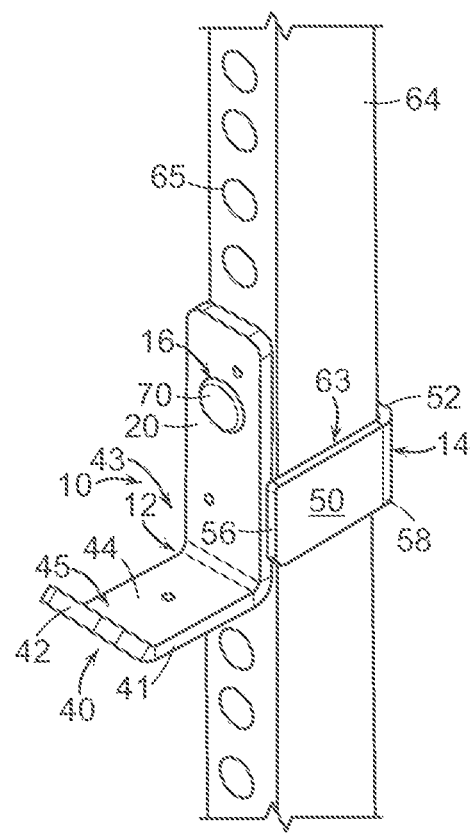
FIG. 6 is a perspective view of the J-cup assembly of FIG. 1 shown seated on a beam of a rack.

As seen in FIG. 6, back plate 20 and clasp member 14 cooperate to receive beam 64. Beam 64 is positioned within channel 63 between back plate 20, extending leg 50, and encasing leg 52. Pin 16 may be received in one of a plurality of apertures 65 formed in beam 64. By positioning pin 16 in a different aperture 65, Bracket assembly 10 can be positioned at any desired height along beam 64 when beam 64 is oriented vertically as seen here. Alternatively, if beam 64 is oriented in a horizontal position, Bracket assembly 10 can be positioned along beam 64 at any desired horizontal location.

Pin 16 is shown in FIGS. 7 and 8 as including a head 70 and a shank 80. Head 70 may be enlarged with respect to shank 80. Head 70 may include a chamfered portion 72 and a tip portion 74. Chamfered portion 72 may have a chamfer angle CA that matches chamfer angle α of countersink 32 of pin opening 28. Tip portion 74 may extend outwardly from countersink 32 when pin 16 is seated in pin opening 28, and may define an outer perimeter 76, an upper surface 78, a thickness TT, and collectively at the countersink interface, a head diameter HD. In certain embodiments, chamfered portion 72 may have a depth CD, which matches the depth G of countersink 32. In certain embodiments, thickness TT of tip portion 74 may be approximately 0.125", and head diameter HD may be approximately 1.000".

Shank 80 may include a proximal end 82 that extends from head 70, a distal end 84, and a body diameter BD. Shank may have a length L between proximal end 82 and distal end 84. In certain embodiments, length L may be approximately 3.813", and body diameter BD may be approximately 0.625", which corresponds to diameter D of cylindrical wall 30 of pin opening 28 of back plate 20.

Advantageously, as pin opening 28 includes a cylindrical wall 30 and a countersink 32, which matingly engage chamfered portion 72 of head 70 and shank 80, respectively, in relatively tight tolerances, the coupling provides for a substantially improved mechanical strength. The strength of such a coupling exceeds the typical welded configuration that is absent such carefully machined and designed surfaces.

It is to be appreciated that the dimensions can be altered, to, for example, accommodate another rig or rack 64. For example, in another configuration that is contemplated, again for illustrative purposes only, head 70 may have a head diameter HD of approximately 1.375 inches, and shank 80 may have a diameter 86 of approximately 1.000" and a length L of approximately 4.490". In such a configuration, pin opening 28 of back plate 20 may have a correspondingly larger diameter D for cylindrical wall and outer diameter F, while back plate 20 may have the same thickness T.

As seen in FIG. 2, pin 16 is directed through pin opening 28 from outer side 22 of back plate 20. Pin 16 is fully directed through pin opening 28 until chamfered portion 72 of head 70 of pin 16 interfaces with countersink 32 of pin opening 16. Once pin 16 is fully seated within pin opening 28, a weld 88 may be applied about a perimeter of tip portion 74 to couple the two structures together, as seen in FIGS. 1 and 2. It will be understood that pin 16 is preferably formed through machining, as is pin opening 28, so that the dimensions are within close tolerances. This insures a tight fit between the components prior to joining through welding. In the embodiments shown, pin 16 extends beyond encasing leg 52 of clasp member 14 (i.e., pin 16 extends entirely through the beam of rack 64).

Figure 9:
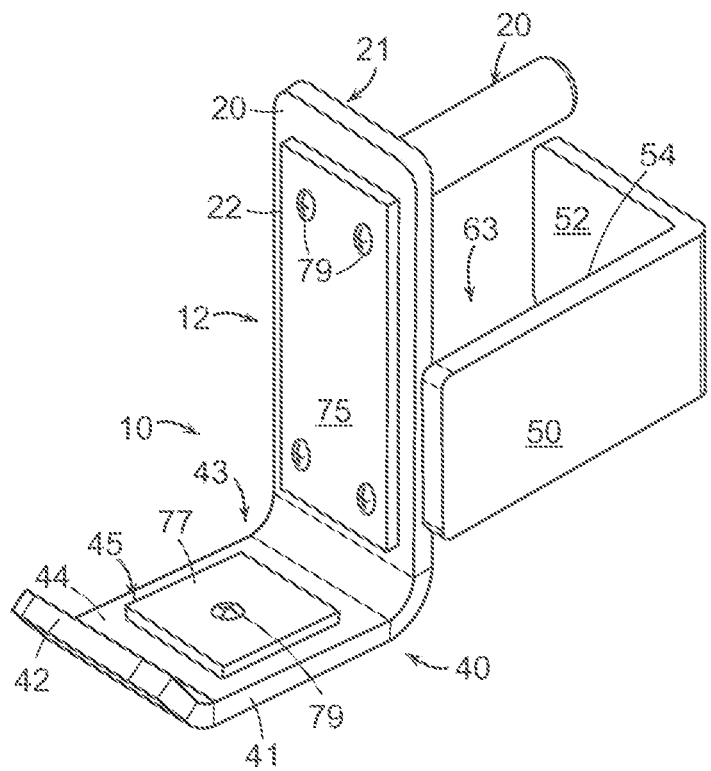
FIG. 9 is a perspective view of another embodiment of a J-Cup embodiment of a bracket assembly shown with protective panels according to aspects of the disclosure.
Figure 10:
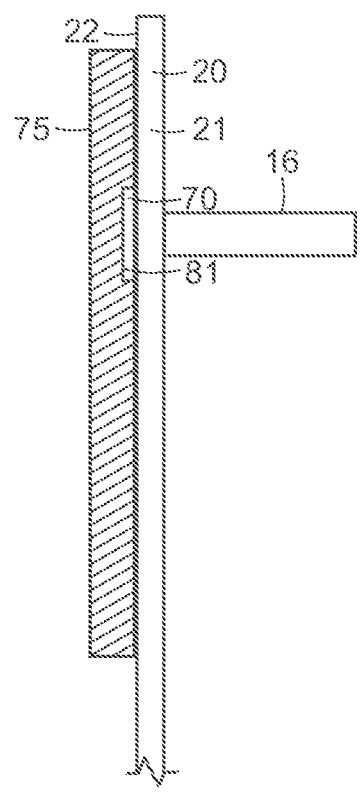
FIG. 10 is an elevation view, shown partially broken away, of the bracket assembly of FIG. 9.

In certain embodiments, as seen in FIG. 9, a first protective panel 75 may be placed on outer side 22 of back plate 20, and a second protective panel 77 may be placed on upper surface 44 of extension member 40 so as to protect the barbell positioned on or interfacing with the Bracket assembly 10. Protective panels 75, 77 may be formed of a resilient or elastic material such as ultra-high molecular weight plastic or acetal resin, or another polymer or plastic material. Protective panels 75, 77 may be secured to back plate 20 and extension member 40, respectively, with an adhesive or a fasteners, such as screws 79. In other embodiments, protective panels 75, 77 may be in the form of a sprayed or painted on material. As seen in FIG. 10, first protective panel 75 may include a recess 81 formed in its inner surface 83 that abuts back plate 20. Head 70 of pin 16 may be received within recess 81.

Figure 11:
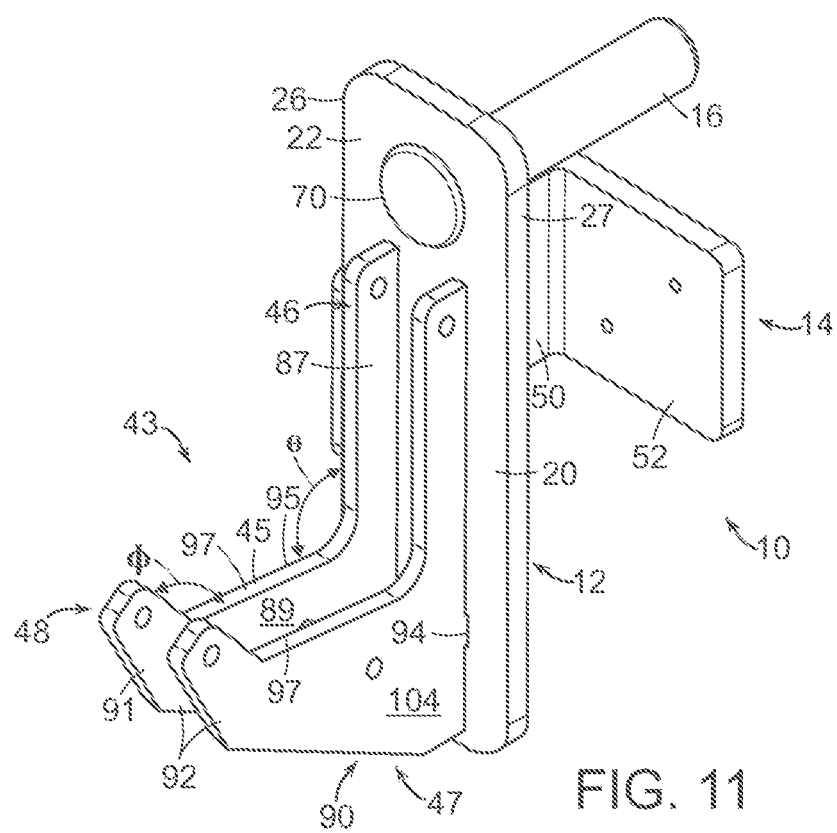
FIG. 11 is a perspective view of another embodiment of a bracket assembly according to aspects of the disclosure.

Another embodiment of a bracket assembly 10 is seen in FIG. 11. The clasp member 14 in this embodiment is a mirror image of the previous embodiment, with clasp member 14 extending from first side edge 26 rather than from second side edge 27 as seen in the previous embodiment. In this embodiment, an extension member 90 includes a pair of substantially J-shaped plates 92, which are spaced from one another and extend outwardly from outer side 22. Plates 92 may be positioned substantially parallel to one another.

The extension member 90 in this embodiment includes a base portion 46 extending upward along the back plate 20, an outwardly extending leg 47 extending outward from the base portion 46, and an outer lip 48 extending upward from the distal end of the leg 47. Plates 92 may be similarly shaped, including a base portion 87, an outward leg 89, and an outer lip 91. Outward leg 89 may include an upper surface 95, and extend outwardly away from back plate 20, defining oblique acute angle θ therebetween. In certain embodiments, angle θ may be between approximately 80° and 100°, more specifically between approximately 82° and 90°, or approximately 85°. Outer lip 91 may extend upwardly from a distal end of outward leg 89, defining an obtuse angle 4 therebetween. In certain embodiments, angle ϕ may be between approximately 125° and 145°, more specifically between approximately 130° and 140°, or approximately 135°.

The base portion 46, the leg 47, and the outer lip 48 of the extension member 90 in FIG. 11 define a channel 43, which can serve as a barbell channel, for example. The extension member 90 defines a support surface 45 within the channel 43 that is configured to engage and support an object such as a barbell. It will be understood that channel 43 and the support surface 45 can be used to hold, hang and/or retain other objects, that is, objects other than a barbell, and while it may be referred to as a barbell channel, it is not limited to any particular use.

Figure 12:
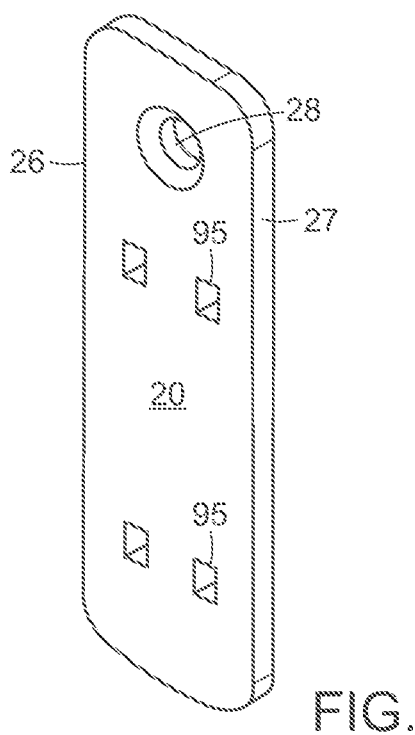
FIG. 12 is a perspective view of the back plate of the bracket assembly of FIG. 11.

It is to be appreciated that plates 92 may be secured to back plate 20 by welding, for example. In certain embodiments, each plate 92 may include a pair of projections 94 that may be received in corresponding recesses 95 in back plate 20, as seen in FIG. 12.

Figure 14:
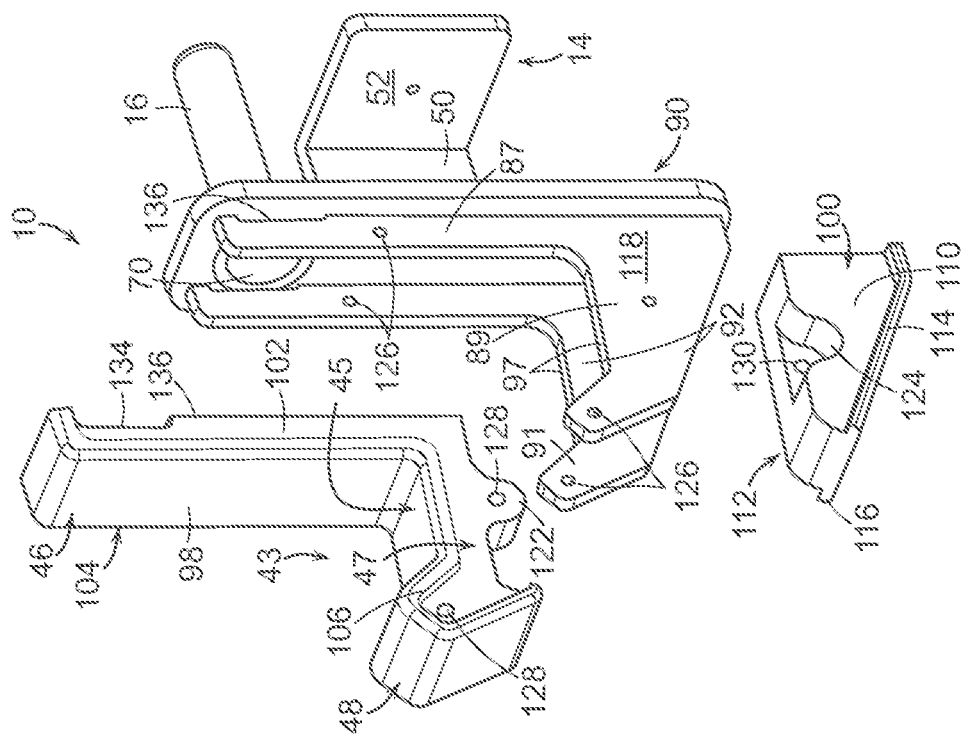
FIG. 14 is an exploded view of a front of the bracket assembly of FIG. 13.
Figure 13:
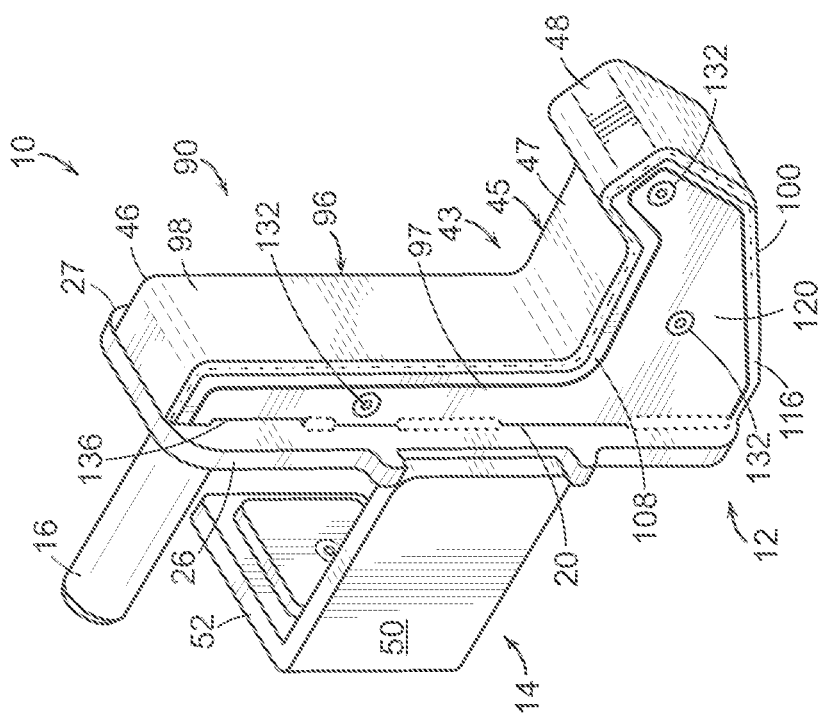
FIG. 13 is a perspective view of another embodiment of a bracket assembly according to aspects of the disclosure.
Figure 15:
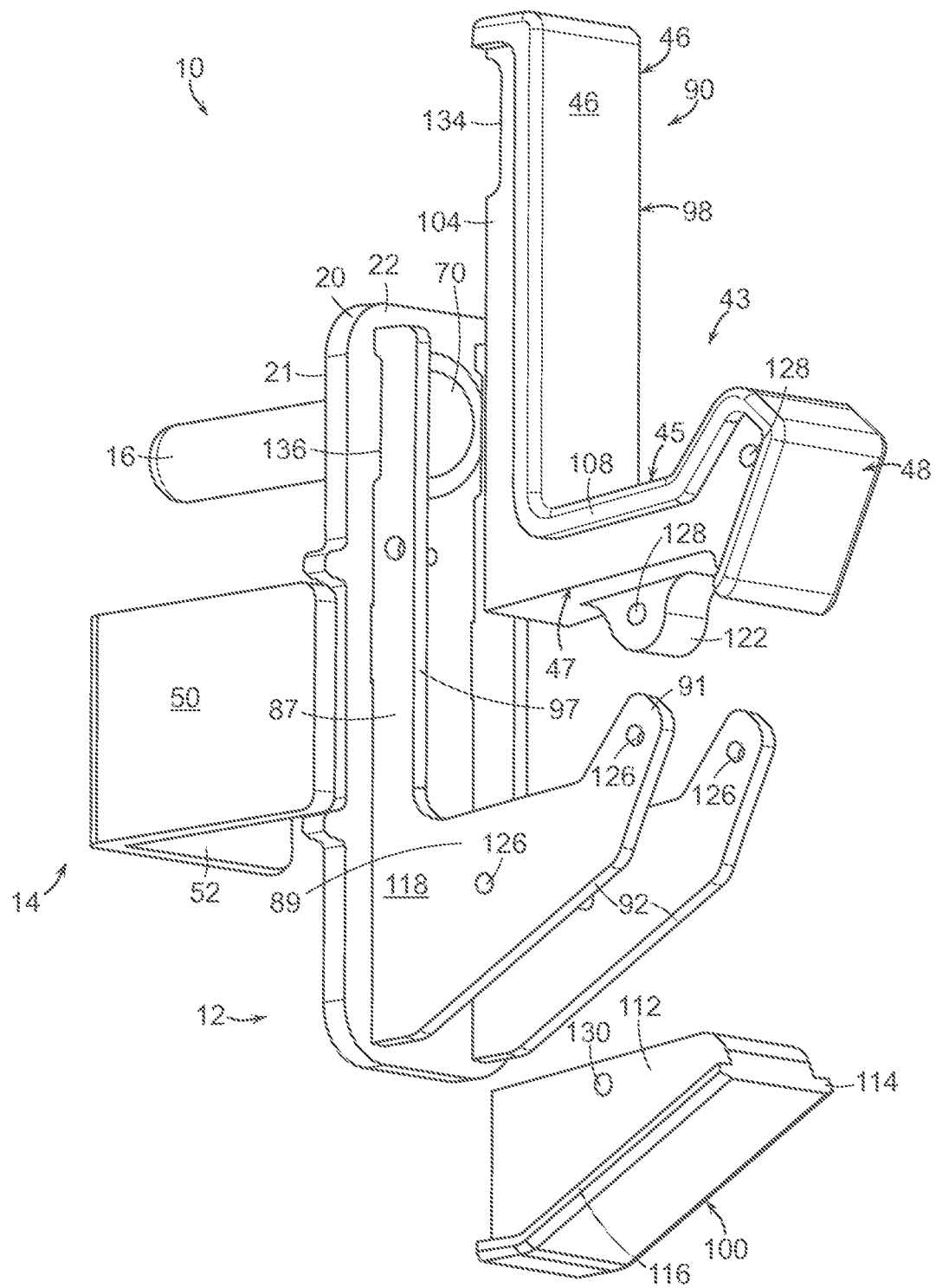
FIG. 15 is an exploded view of a front of the bracket assembly of FIG. 13.
Figure 16:
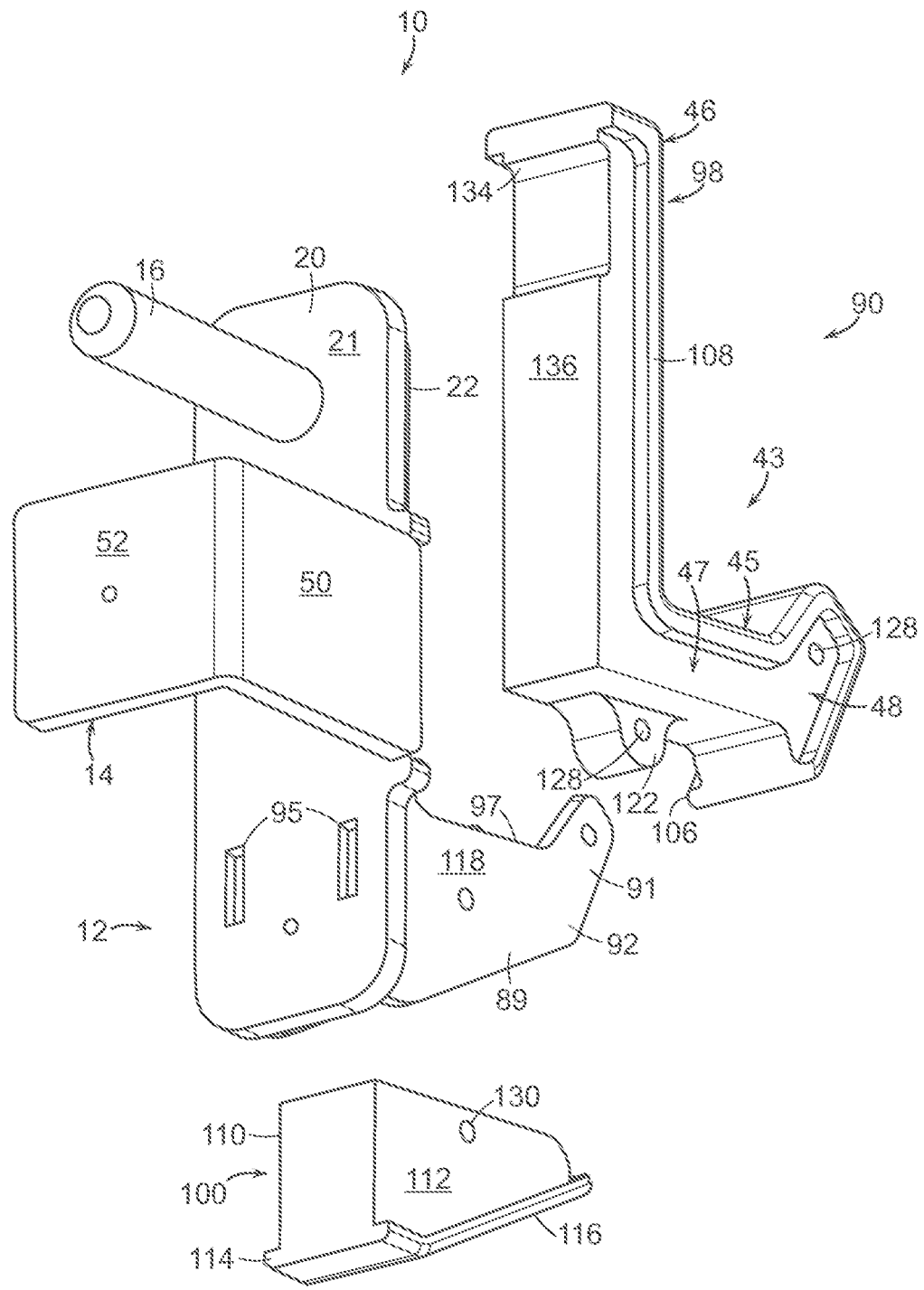
FIG. 16 is an exploded view of a rear of the bracket assembly of FIG. 13.
Figure 17:
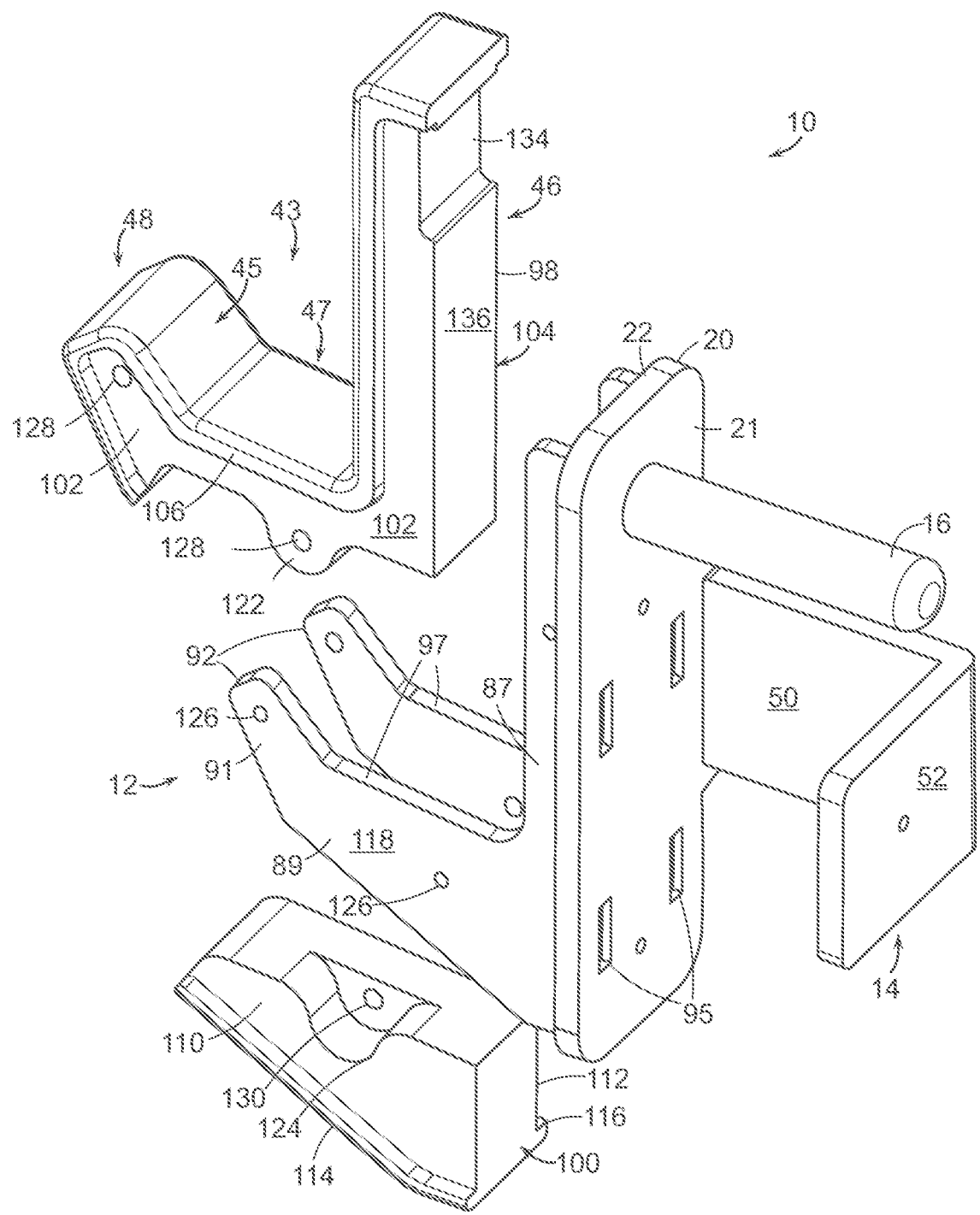
FIG. 17 is an exploded view of a rear of the bracket assembly of FIG. 13.
Figure 18:
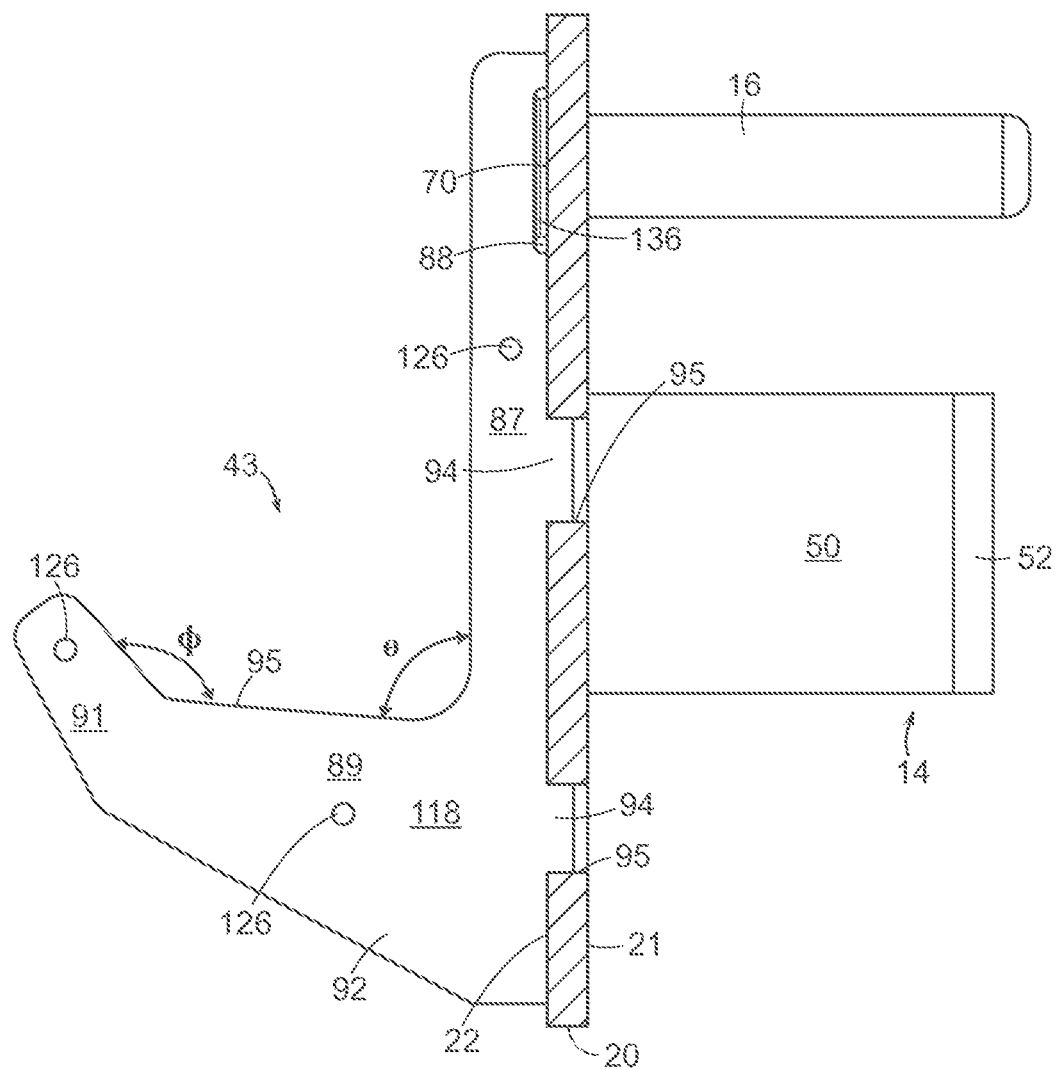
FIG. 18 is an elevation view, partially in section, of a portion of the bracket assembly of FIG. 13.

In certain embodiments, as seen in FIGS. 13-18, extension member 90 may include a cover 96 that is nested with and covers exposed outer surfaces 97 of plates 92. In one embodiment, the cover 96 forms at least the entire support surface 45 and defines the entire boundary of the channel 43. In this configuration, as shown in FIGS. 13-14, the cover 96 covers and forms all surfaces of the base portion 46, the leg 47, and the outer lip 48 of the extension member 90 that confront the channel 43. Cover 96 may include a first or top portion 98 that is configured to cover the top and front of outer surfaces 97. First portion 98 may be substantially J-shaped to match the shape of plates 92. Cover 96 may also include a second or bottom portion 100 that is configured to cover the bottom of outer surfaces 97. Thus, first portion 98 and second portion 100 cooperate to extend along and cover the entirety of outer surfaces 97 of plates 92 and, therefore, cover 96 may serve to protect a user's hands and fingers from engaging the edges of the exposed outer surfaces 97 of plates 92 thereby reducing the risk of injury to the user. The first and second portions 98, 100 in this embodiment are formed as separate pieces connected together in constructing the extension member 90.

First portion 98 may include a first side 102 and an opposed second side 104. A first lip 106 may extend outwardly away from first side 102 along an entirety of a top surface of first portion 98. A second lip 108 may extend outwardly away from second side 104 along an entirety of the top surface of first portion 98. When bracket assembly 12 is assembled, first lip 106 is seated along and completely covers the top and front surfaces of the rightmost plate 92, and second lip 108 is seated along and completely covers the top and front surfaces of the leftmost plate 92.

Second portion 100 also may include a first side 110 and an opposed second side 112. A first lip 114 may extend outwardly away from first side 110 along an entirety of a bottom surface of second portion 100. A second lip 116 may extend outwardly away from second side 112 along an entirety of the bottom surface of second portion 100. When bracket assembly 12 is assembled, first lip 114 is seated along and completely covers the bottom surfaces of the rightmost plate 92, and second lip 116 is seated along and completely covers the bottom surfaces of the leftmost plate 92.

As illustrated, the side edges of first lip 106 of first portion 98 and first lip 114 of second portion 100 are substantially flush with a side surface 118 of the rightmost plates 92. Similarly, side edges of second lip 108 of first portion 98 and second lip 116 of second portion 100 are substantially flush with a side surface 120 of the leftmost plates 92. Thus, the lips of first and second portions 96, 98 extend along and cover the exposed outer edges 97 of 11

Cover 96 may be formed of a plastic or rubber material, such as ultra-high molecular weight plastic, acetal resin, urethane, or nylon, or other plastic or polymer materials. Therefore, cover 96 serves to form a softer surface upon which barbells or other structures are seated.

In certain embodiments, first portion 98 may include a projection 122 that extends downwardly from the underside of the first portion 98 and is received in a mating recess 124 formed in the upper side of the second portion 100, thereby helping to interlock first portion 98 and second portion 100 when bracket assembly 12 is assembled. In certain embodiments, projection 122 and recess 124 are both semi-hemispherical and shape. In certain embodiments, projection 122 and recess 124 extend along only a portion of a width (measured parallel to the back plate 20) of first portion 98 and second portion 100. In the illustrated embodiment, projection 122 extends downwardly along first side 102 and extends laterally only halfway across first portion 98. Similarly, in the illustrated embodiment, recess 124 is formed on first side 110 of second portion 100 and extends laterally only halfway into second portion 100.

Cover 96 may be secured to plates 92 with fasteners such as bolts, for example. In the illustrated embodiment, apertures 126 may be formed in plates 92, mating apertures 128 may be formed in first portion 98, and a mating aperture 130 may be formed in second portion 100.

Bolts 132, seen in FIG. 13, may then extend through the sets of mating apertures 126, 128, and 130 to secure first portion 98 and second portion 100 to plates 92. It is to be appreciated that in certain embodiments, the apertures 126 of one of the plates 92 may be countersunk to receive a head of one of the bolts 132 while the apertures in the other plate 92 may be threaded to receive the threaded ends of bolts 132.

In the illustrated embodiment, an aperture 130 formed in second portion 100 is positioned such that it aligns with an aperture 128 formed in projection 122 of first portion 98, which serves to fully interlock first portion 98 and second portion 100 together when a bolt 132 extends through these apertures 128, 130.

In certain embodiments, a recess or groove 134 may be formed on an inner surface 136 of first portion 98 proximate a top of first portion 98. Similarly, a recess or groove 136 may be formed on an inner surface of each base portion 87 proximate a top of base portion 87. Head 70 of pin 16 may be received in groove 134 and grooves 136.

Figure 19:
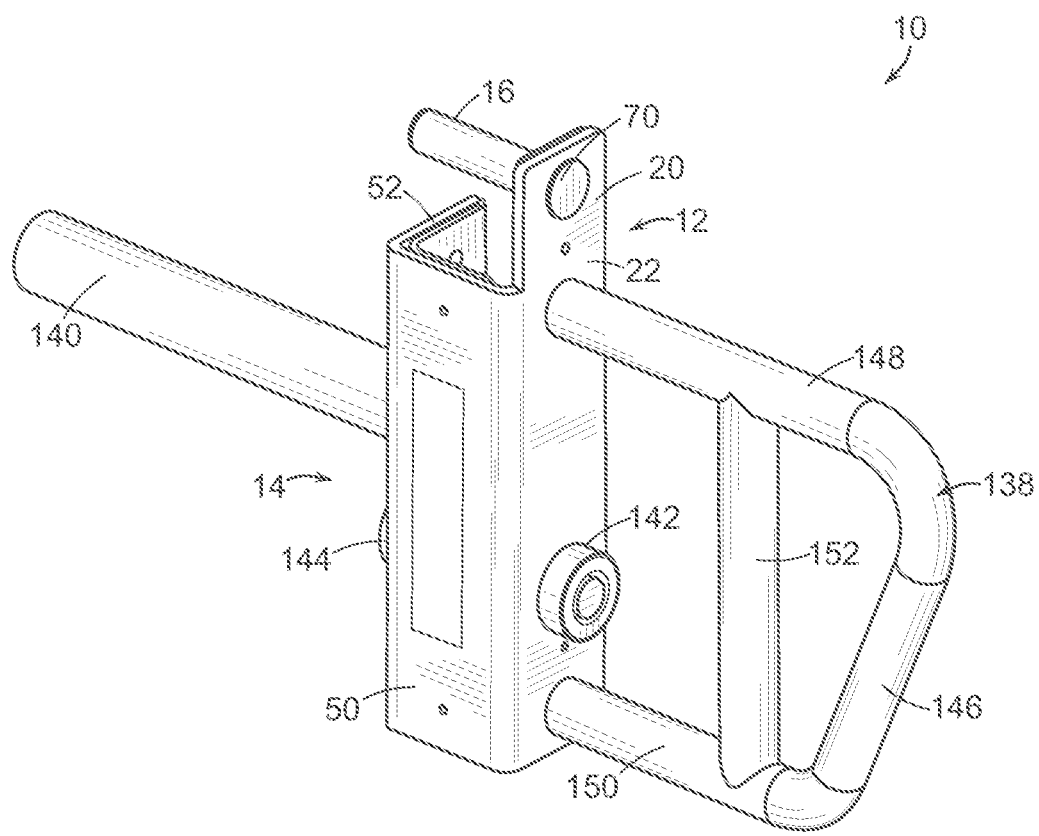
FIG. 19 is a perspective view of another embodiment of a bracket assembly according to aspects of the disclosure.

Another embodiment of a bracket assembly 10 is seen in FIG. 19. In this embodiment, a handle 138 may extend outwardly away from outer side 22 of back plate 20, and a bar 140 may extend outwardly away from encasing leg 52. Bar 140 may have a cylindrical cross-section. A user may place weights, such as weight plates, on bar 140, and the user may grasp handle 138 to perform weightlifting exercises. A removable pin 142 may be inserted through an aperture (not visible) in clasp member 14 and through a corresponding aperture 65 of beam 64. In certain embodiments, removable pin 142 may be a threaded pin with a set screw 144 seated in one end thereof. It is to be appreciated that other types of removable pins could be used, such as a non-threaded pin and cotter pin combination. Other suitable removable pins will become readily apparent to those skilled in the art, given the benefit of this disclosure.

In the illustrated embodiment, handle 138 includes a substantially U-shaped member 146 with one arm 148 having a length greater than the other arm 150. A crossmember 152 may extend between arms 148, 150 of substantially U-shaped member 146. In the illustrated embodiment, substantially U-shaped member 146 and crossmember 152 may have a cylindrical cross-section, allowing a user to easily grasp any portion of handle 138 to perform weightlifting exercises.

Those having skill in the art, with the knowledge gained from the present disclosure, will recognize that various changes can be made to the disclosed bracket assembly, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It is also understood that in other embodiments, the various devices, components, and features of the bracket assembly described herein may be constructed with similar structural and functional elements having different configurations, including different ornamental appearances. It should be understood that the foregoing description is provided for clarity only and is merely exemplary. The spirit and scope of the present disclosure is not limited to the above examples, but is encompassed by the following claims.

What is claimed is:

1. A bracket assembly for use in association with a rack, the bracket assembly comprising:
    a back plate with an outer side and an inner side opposite the outer side, the back plate including a pin opening extending through the back plate from the outer side to the inner side;
    a clasp member extending from the back plate and having an extending portion extending rearwardly from the back plate and an encasing portion extending laterally from the extending portion, wherein the extending portion and the encasing portion of the clasp member and the inner side of the back plate define a channel configured to receive a beam of the rack;
    a pin seated in the pin opening, the pin having a shank and a head that is enlarged with respect to the shank, the head of the pin being positioned at the outer side of the back plate and the shank extending from the head through the pin opening and into the channel, such that the shank of the pin is configured to engage the beam of the rack within the channel, the head being welded to the outer side of the back plate; and
    a functional member connected to the back plate and extending away from the back plate, the functional member being configured for use in a weightlifting exercise.

2. The bracket assembly of claim 1, wherein the pin opening includes a cylindrical portion extending inward from the inner side of the back plate and receiving the shank therethrough, and a countersink on the outer side of the back plate, and wherein the countersink receives the head of the pin.

3. The bracket assembly of claim 2, wherein the countersink has a chamfered configuration.

4. The bracket assembly of claim 2, wherein the head of the pin includes a chamfered portion abutting the countersink when the shank extends through the pin opening.

5. The bracket assembly of claim 1, wherein at least a portion of the functional member is integrally formed with the back plate.

6. The bracket assembly of claim 1, wherein the functional member is welded to the back plate.

7. The bracket assembly of claim 1, wherein the functional member comprises a handle configured for gripping by a user and a weight post configured to support one or more weight plates.

8. The bracket assembly of claim 1, wherein the functional member is an extension member configured to support an object.

9. The bracket assembly of claim 1, wherein the functional member is connected to the outer side of the back plate and extends outwardly from the back plate.

10. The bracket assembly of claim 9, wherein the protective panel covers the head of the pin.

11. The bracket assembly of claim 9, wherein the protective panel has a surface abutting the outer side of the back plate and a recess formed in the surface, wherein the head of the pin is received in the recess.

12. The bracket assembly of claim 1, further comprising a protective panel connected to the outer side of the back plate.

13. A bracket configured for connection to a functional member configured for use in a weightlifting exercise to form a bracket assembly for use in association with a rack, the bracket comprising:
   a back plate with an outer side and an inner side opposite the outer side, the back plate including a pin opening extending through the back plate from the outer side to the inner side, wherein the back plate is configured for connection to a functional member in a configuration such that the functional member extends away from the back plate;
   a clasp member extending from the back plate and having an extending portion extending rearwardly from the back plate and an encasing portion extending laterally from the extending portion, wherein the extending portion and the encasing portion of the clasp member and the inner side of the back plate define a channel configured to receive a beam of the rack; and
   a pin seated in the pin opening, the pin having a shank and a head that is enlarged with respect to the shank, the head of the pin being positioned at the outer side of the back plate and the shank extending from the head through the pin opening and into the channel, such that the shank of the pin is configured to engage the beam of the rack within the channel, the head being welded to the outer side of the back plate.

14. The bracket of claim 13, wherein the pin opening includes a cylindrical portion extending inward from the inner side of the back plate and receiving the shank therethrough, and a countersink on the outer side of the back plate, and wherein the countersink receives the head of the pin.

15. The bracket of claim 14, wherein the countersink has a chamfered configuration.

16. The bracket of claim 14, wherein the head of the pin includes a chamfered portion abutting the countersink when the shank extends through the pin opening.

17. The bracket of claim 13, further comprising a protective panel connected to the outer side of the back plate.

18. The bracket of claim 17, wherein the protective panel covers the head of the pin.

19. The bracket of claim 17, wherein the protective panel has a surface abutting the outer side of the back plate and a recess formed in the surface, wherein the head of the pin is received in the recess.

20. A bracket assembly for use in association with a rack, the bracket assembly comprising:
   a back plate with an outer side and an inner side opposite the outer side, the back plate including a pin opening extending through the back plate from the outer side to the inner side, wherein the pin opening includes a countersink on the outer side of the back plate, the countersink having a chamfered configuration;
   a clasp member extending from the back plate and having an extending portion extending rearwardly from the back plate and an encasing portion extending laterally from the extending portion, wherein the extending portion and the encasing portion of the clasp member and the inner side of the back plate define a channel configured to receive a beam of the rack;
   a pin having a shank and a head that is enlarged with respect to the shank, wherein the pin is seated in the pin opening such that the countersink receives the head of the pin, the head of the pin being positioned at the outer side of the back plate and the shank extending from the head through the pin opening and into the channel, such that the shank of the pin is configured to engage the beam of the rack within the channel, the head being welded to the outer side of the back plate, wherein the head of the pin includes a chamfered portion abutting the countersink of the pin opening when the shank extends through the pin opening, and the chamfered portion and the countersink have matching chamfer angles; and
   a functional member connected to the back plate and extending away from the back plate, the functional member being configured for use in a weightlifting exercise.

21. The bracket assembly of claim 20, wherein at least a portion of the functional member is integrally formed with the back plate.

22. The bracket assembly of claim 20, wherein the functional member is welded to the back plate.

* * * * *